May 4, 1965   H. B. MATTHEWS   3,181,476
POWER TRANSMISSION
Filed Sept. 14, 1961   2 Sheets-Sheet 1
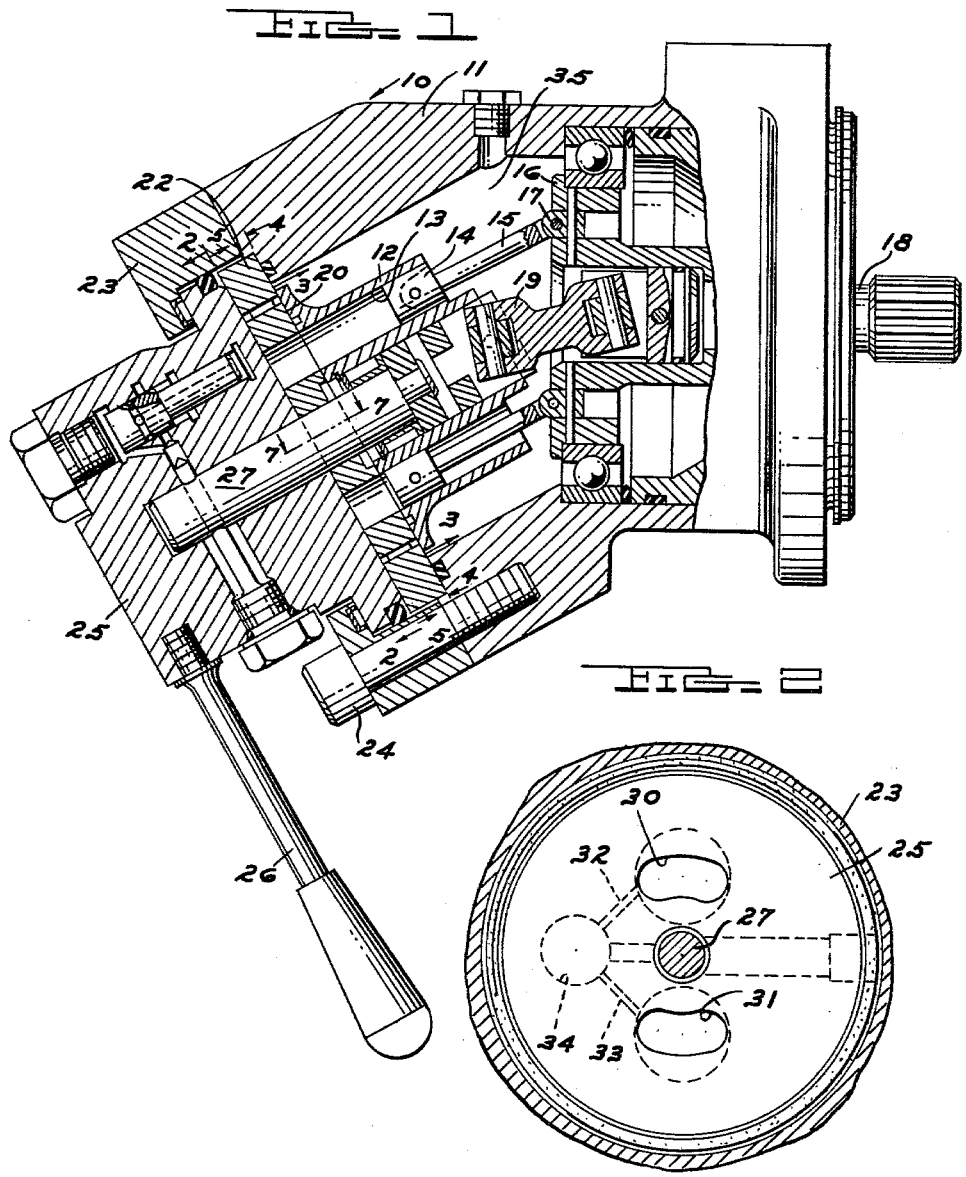
INVENTOR.
HUGH B. MATTHEWS
BY
Barnes, Kisselle, Raisch & Choate
ATTORNEYS

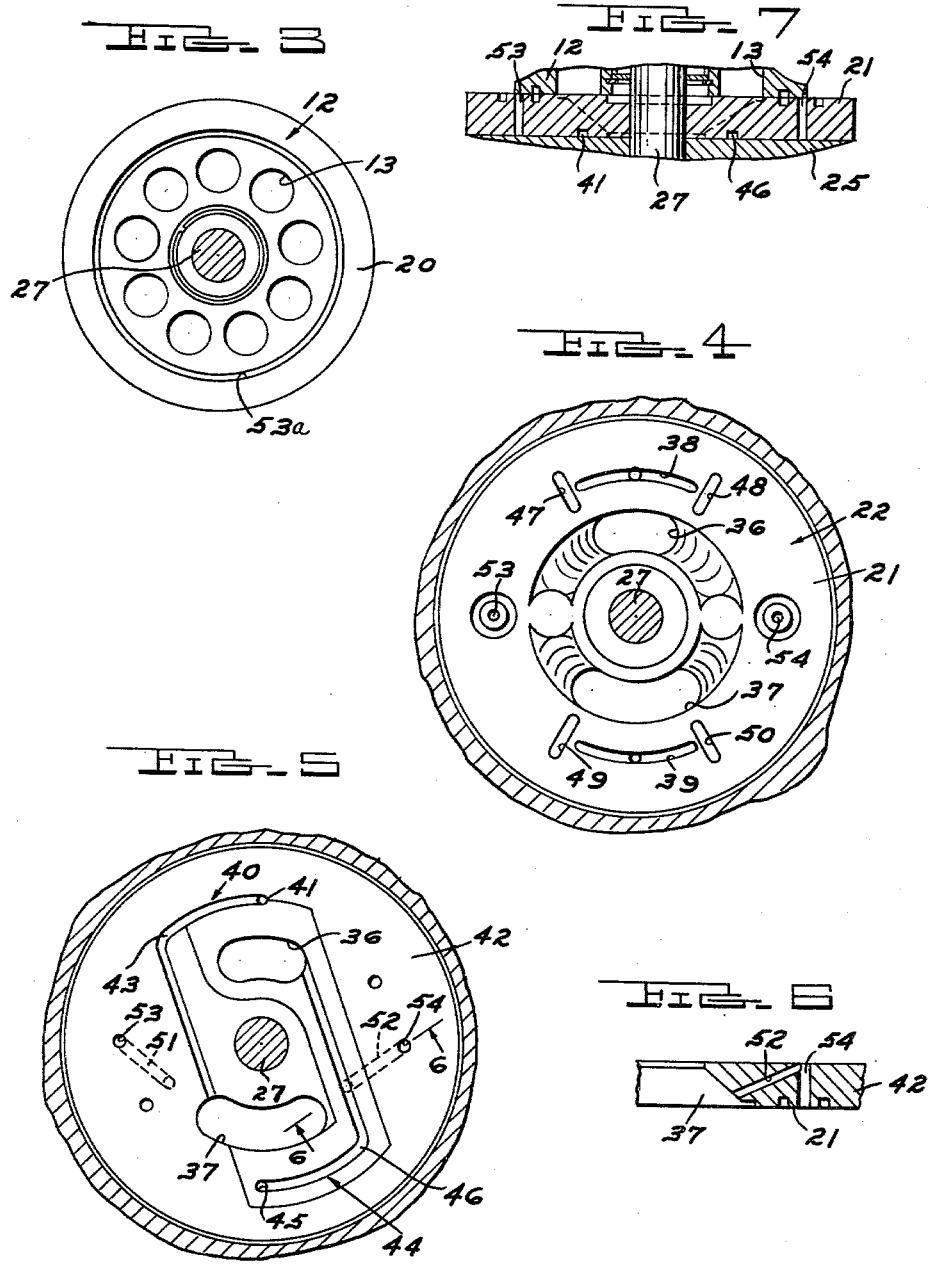

United States Patent Office 3,181,476
Patented May 4, 1965

3,181,476
POWER TRANSMISSION
Hugh B. Matthews, Birmingham, Mich., assignor to Sperry Rand Corporation, a corporation of Delaware
Filed Sept. 14, 1961, Ser. No. 138,046
7 Claims. (Cl. 103—162)

This invention relates to power transmissions and particularly to high speed pressure energy translating devices of the rotary type.

Such rotary fluid pressure energy translating devices comprise a rotatably mounted drive member, a plurality of cylinders, pistons reciprocable in the cylinders and motion converting means interconnecting the pistons and the drive member. An inlet and an outlet communicates successively with one of the ends of each cylinder. When such a device is operated as a motor by applying fluid under pressure to the inlet, the motion converting means changes the reciprocating motion of the pistons to rotation of the drive member. When such a device is operated as a pump by rotating the drive member, the motion converting means changes the rotation of the drive member into reciprocating motion of the pistons to pump fluid from the inlet to the outlet.

The invention is generally concerned with fluid pumps or motors of the rotary axial piston type. For purposes of convenience, the invention will be described as a fluid pump, but it should be understood that the term "pump" when used herein embraces both a fluid pump and a fluid motor.

It has been heretofore suggested that the output of such a device may be varied by utilizing a movable valve plate having an inlet and an outlet opening which communicates successively with one of the ends of each cylinder. By rotating the valve plate, the phase relation between piston stroking and coacting porting is altered.

In both the fixed displacement and variable displacement pumps, of the type described, a problem of providing sufficient fluid to the inlet to insure most efficient operation has always been present. Upon rotation of the valve plate in the variable displacement pump, the inlet size is varied resulting in a considerable loss due to heat and friction.

It is an object of this invention to provide an improved rotary pressure energy translating device wherein the problem of providing fluid to the inlet is minimized.

It is a further object of the invention to provide an improved variable displacement fluid energy translating device wherein the problem of supplying adequate fluid to the inlet is minimized.

Basically, the invention comprises forming the cylinder openings of substantially constant diameter throughout their entire length; pressurizing the casing of the rotary pressure translating device at a pressure ranging between inlet and outlet pressure at which the device is operated and preferably substantially equal to one-half the sum of the inlet and outlet pressures; and providing cavities adjacent the inlet and outlet openings of the valve plate between the valve plate and the cylinder block and interconnecting the cavity adjacent the inlet opening to the outlet and the cavity adjacent the outlet opening to the inlet so that the cylinder block is maintained against the valve plate. In this fashion, the large opening in the end of each cylinder adjacent the valve plate provides a ready passage of the fluid to the inlet. Moreover, in the variable displacement type of device wherein the valve plate is rotated to change the phase relationship between the piston stroking and the coacting porting, a slight movement of the movable valve plate exposes a substantially large area of the cylinders thereby making the inlet pressure less critical and minimizing restrictive forces on the fluid passing to the cylinders.

In the drawings:

FIG. 1 is a longitudinal part-sectional view of a fluid pressure energy translating device embodying the invention.

FIG. 2 is a fragmentary sectional view taken along the line 2—2 in FIG. 1.

FIG. 3 is a sectional view taken along the line 3—3 in FIG. 1.

FIG. 4 is a fragmentary sectional view taken along the line 4—4 in FIG. 1 showing one side of the valve plate.

FIG. 5 is a fragmentary sectional view taken along the line 5—5 in FIG. 1 showing the other side of the valve plate.

FIG. 6 is a fragmentary sectional view taken along the line 6—6 in FIG. 5.

FIG. 7 is a fragmentary sectional view taken along the line 7—7 in FIG. 1.

Referring to FIG. 1, the invention relates to a fluid pressure energy translating device 10 which comprises a housing 11 and a rotatable cylinder block 12. Block 12 includes a plurality of circumferentially spaced cylinders 13 of constant diameter throughout their length in which pistons 14 are reciprocably mounted. Connecting rods 15 are universally pivoted to pistons 14 at one end and are connected at the other end thereof to a drive member 16 by a universal joint 17. The drive member 16 is fixed, in turn, to a drive member 18. A double cardan universal joint 19 extends between drive member 18 and cylinder block 12 in order to maintain them in proper angular alignment.

The cylinder block 12 includes a valving face 20 that engages the surface 21 of a valve plate 22 which is rotatably mounted in a head 23 fixed to the housing 11 by bolts 24.

Valve plate 22 is fixed to a rotatable block 25 in a suitable manner, as by aligning pins, so that its angular position relative to the housing can be changed. As is well-known in the art, the movement of the valve plate in order to vary the displacement of the pressure energy translating device can be achieved manually, as by handle 26, or hydraulically, for example, in the manner shown in the application of Burns et al., Serial No. 786,734, filed January 14, 1959 and assigned to the assignee of the present application.

The device includes a pintle 27 that is fixed to the head 25 and extends through the valve plate 22 and serves as a means for rotatably mounting the cylinder block 12.

As shown in FIG. 2, block 25 includes an arcuate or kidney shaped inlet opening 30 and an arcuate or kidney shaped outlet opening 31. Passages 32, 33 connect the inlets 30, 31 to a bore 34 in which a pressure regulating valve is provided that, in turn, supplies pressure to hydraulic fluid in the cavity 35 of the housing surrounding the cylinder block 12. The presure supplied ranges between the inlet and outlet pressure and preferably is substantially equal to one-half the sum of the inlet and outlet pressures.

Referring to FIGS. 4 and 5, valve plate 22 is provided with kidney shaped inlet and outlet openings 36, 37 that cooperate with inlet and outlet 30, 31 in the block 25 to provide and take away fluid from the cylinders 13 in cylinder block 12. By rotating the valve plate 22, the phase relation between the cylinder block and the valve plate can be achieved.

As shown in FIG. 4, valve plate 22 includes an arcuate groove 38 in the face 21 adjacent the inlet opening 36 and an arcuate groove 39 in the face 21 adjacent the outlet opening 37. A passage 40 connects groove 38 with outlet opening 37 that includes a hole 41 extending from the base of the groove 38 to the opposite face 42 of the valve plate and a connecting groove 43 extending from the hole 41 along face 42 to the outlet opening 37. Similarly, groove 39 is connected to the inlet opening 36 by a passage 44 that includes a hole 45 extending from the base of the groove to the opposite face 42 of the valve plate and a connecting groove 46 extending from the hole 45 along face 42 to the inlet opening 36.

In this fashion, a force is applied, due to outlet pressure, by the hydraulic pressure in the groove 38 which tends to force the cylinder block 12 away from the inlet 36 and a force, due to inlet pressure, is applied by hydraulic pressure in groove 39 of reduced amount which tends to pull the cylinder block toward the valve plate. This may be more readily understood by referring to FIG. 1 wherein it can be appreciated that the application of pressure in the cavity 35, which pressure is one-half the sum of the inlet and outlet pressures, produces a force on the cylinder block and, at the same time, allowing the periphery of the cylinder block that tends to urge the cylinder block against the valve plate. However, the force of outlet pressure in the outlet side of the cylinder block is greater and tends to cause an upward movement that is unbalanced. By providing inlet pressure adjacent the outlet side of the cylinder block and outlet pressure adjacent the inlet side of the cylinder block, a couple is produced that tends to oppose the unbalanced force of outlet pressure in the outlet ends of the cylinder.

Additional balancing or hold down can be achieved by providing radial grooves 47, 48 adjacent the ends of the groove 38 and grooves 49, 50 adjacent the ends of the grooves 39.

In order to balance additional couples as may be found either due to unbalance forces inherent in the operation or resulting, for example, from centrifugal force, hold-down pads may be provided in the face 21 of the valve plate to which hydraulic fluid is supplied. Thus, passages 51, 52 in the valve plate can communicate with the outlet opening 37 and the face 21 to supply hydraulic fluid to an annular groove 53a in the face 20 of the cylinder block. This, in turn, is permitted to bleed through openings 53, 54 to the face of the cylinder block.

I claim:

1. In a hydraulic power system, the combination comprising a rotary fluid pressure energy translating device, said device comprising a housing, said device comprising a cylinder block rotatably mounted in said housing and a plurality of cylinders, each said cylinder having a bore of substantially constant diameter throughout its length, pistons reciprocable in said cylinders, a rotary drive member and motion converting means interconnecting the reciprocating piston to the rotatable drive member, said device having an inlet and outlet communicating successively with one end of each said cylinder, a valve plate in said housing having arcuate inlet and outlet openings communicating with said inlet and outlet, the radial width of said inlet and outlet openings being substantially equal to the diameter of said cylinders, means in said housing defining a chamber at the end of said cylinder block remote from said inlet and said outlet adjacent the other ends of said cylinders, said pistons having portions exposed to hydraulic fluid in said chamber, pressure regulating means connected to said inlet and said outlet and communicating with said chamber for continuously applying a pressure to hydraulic fluid in said chamber and in turn to said cylinder block and said pistons, said pressure having a substantially constant magnitude ranging between the pressure at the inlet and the pressure at the outlet, means defining a cavity between said cylinder block and each of said inlet and outlet openings of said valve plate, respectively, and means interconnecting the outlet to the cavity adjacent the inlet opening and means interconnecting the inlet to said cavity adjacent the outlet opening.

2. In a hydraulic power system, the combination comprising a rotary fluid pressure energy translating device, said device comprising a housing, said device comprising a cylinder block rotatably mounted in said housing and a plurality of cylinders, each said cylinder having a bore of substantially constant diameter throughout its length, pistons reciprocable in said cylinders, a rotary drive member and motion converting means interconnecting the reciprocating piston to the rotatable drive member, a valve plate in said housing having arcuate inlet and outlet openings communicating with said inlet and said outlet and, in turn, successively with one end of each said cylinder, the radial width of said inlet and outlet openings being substantially equal to the diameter of said cylinders, means in said housing defining a chamber at the end of said cylinder block remote from said inlet and said outlet adjacent the other ends of said cylinders, said pistons having portions exposed to hydraulic fluid in said chamber, pressure regulating means connected to said inlet and said outlet and communicating with said chamber for continuously applying a pressure to hydraulic fluid in said chamber and in turn to said cylinder block and said pistons, said pressure having a substantially constant magnitude ranging between the pressure at the inlet and the pressure at the outlet, means defining a cavity between said cylinder block and each of said inlet and outlet openings of said valve plate, respectively, and means interconnecting the outlet to the cavity adjacent the inlet opening and means interconnecting the inlet to said cavity adjacent the outlet opening.

3. The combination set forth in claim 2 including means defining another cavity in said valve plate between said valve plate and said cylinder block and means interconnecting said last-mentioned cavity to said outlet.

4. The combination set forth in claim 2 wherein said means interconnecting said cavities with said inlet and outlet openings, respectively, comprise passages in said valve plate.

5. In a hydraulic power system, the combination comprising a rotary fluid pressure energy translating device, said device comprising a housing, said device comprising a cylinder block rotatably mounted in said housing and a plurality of cylinders, each said cylinder having a bore of substantially constant diameter throughout its length, pistons reciprocable in said cylinders, a rotary drive member and motion converting means interconnecting the reciprocating piston to the rotatable drive member, a valve plate in said housing having arcuate inlet and outlet openings communicating with said inlet and said outlet and, in turn, successively with one end of each said cylinder, the radial width of said inlet and outlet openings being substantially equal to the diameter of said cylinders, means in said housing defining a chamber at the end of said cylinder block remote from said inlet and said outlet adjacent the other ends of said cylinders, said pistons having portions exposed to hydraulic fluid in said chamber, pressure regulating means connected to said inlet and said outlet and communicating with said chamber for continuously applying a pressure to hydraulic fluid in said chamber and in turn to said cylinder block and said pistons, said pressure having a substantially constant magnitude ranging between the pressure at the inlet and the pressure at the outlet, and an arcuate groove in the face of said valve plate adjacent the cylinder block and adjacent each of the inlet and outlet openings, and a first passage in said valve plate connecting the outlet opening in said valve plate to the arcuate groove adjacent the inlet opening and a second passage in said valve plate connecting the inlet opening in said valve plate to the arcuate groove adjacent the outlet opening of said valve plate.

6. The combination set forth in claim 5 wherein each said passage includes a groove in the opposite face of said valve plate communicating with an opening and a hole extending through said valve plate and interconnecting said last-mentioned groove and said arcuate groove.

7. In a hydraulic power system, the combination comprising a rotary fluid pressure energy translating device, said device comprising a housing, said device comprising a cylinder block rotatably mounted in said housing and a plurality of cylinders, each said cylinder having a bore of substantially constant diameter throughout its length, pistons reciprocable in said cylinders, a rotary drive member and motion converting means interconnecting the reciprocating piston to the rotatable drive member, a valve plate in said housing having arcuate inlet and outlet openings communicating with said inlet and said outlet and, in turn, successively with one end of each said cylinder, the radial width of said inlet and outlet openings being substantially equal to the diameter of said cylinders, means for rotating the valve plate to vary the displacement of the device by changing the phase relation of the inlet and outlet openings therein relative to the cylinders, means in said housing defining a chamber at the end of said cylinder block remote from said inlet and said outlet adjacent the other ends of said cylinder block, said pistons having portions exposed to hydraulic fluid in said chamber, pressure regulating means connected to said inlet and said outlet and communicating with said chamber for continuously applying a pressure to hydraulic fluid in said chamber and in turn to said cylinder block and said pistons, said pressure having a substantially constant magnitude ranging between the pressures at the inlet and the pressure at the outlet, and an arcuate groove in the face of said valve plate adjacent the cylinder block and adjacent each of the inlet and outlet openings, and a first passage in said valve plate connecting the outlet opening in said valve plate to the arcuate groove adjacent the inlet opening and a second passage in said valve plate connecting the inlet opening in said valve plate to the arcuate groove adjacent the outlet opening of said valve plate.

References Cited by the Examiner

UNITED STATES PATENTS

| | | | |
|---|---|---|---|
| 951,278 | 3/10 | Janney | 103—162 |
| 1,817,080 | 8/31 | Howard | 103—162 |
| 1,867,308 | 7/32 | Durner | 103—162 |
| 2,288,768 | 7/42 | Zimmerman | 103—162 |
| 2,364,301 | 12/44 | MacNeil | 103—162 |
| 2,543,624 | 2/51 | Gabriel | 103—162 |
| 2,640,433 | 6/53 | Mathys | 103—162 |
| 2,642,809 | 6/53 | Born et al. | 103—162 |
| 2,733,666 | 2/56 | Poulos | 103—162 |
| 2,735,407 | 2/56 | Born | 103—162 |
| 2,813,493 | 11/57 | Aspelin | 103—162 |
| 2,847,984 | 8/58 | Gallant | 103—162 |
| 2,915,985 | 12/59 | Budzich | 103—162 |
| 2,916,334 | 12/59 | Thoma | 103—162 |
| 2,963,983 | 12/60 | Wiggermann | 103—162 |
| 2,972,962 | 2/61 | Douglas | 103—162 |
| 3,046,906 | 7/62 | Budzich | 103—162 |

FOREIGN PATENTS

| | | |
|---|---|---|
| 441,952 | 3/27 | Germany. |
| 865,648 | 4/61 | Great Britain. |

LAURENCE V. EFNER, *Primary Examiner.*

JOSEPH H. BRANSON, JR., *Examiner.*